UNITED STATES PATENT OFFICE.

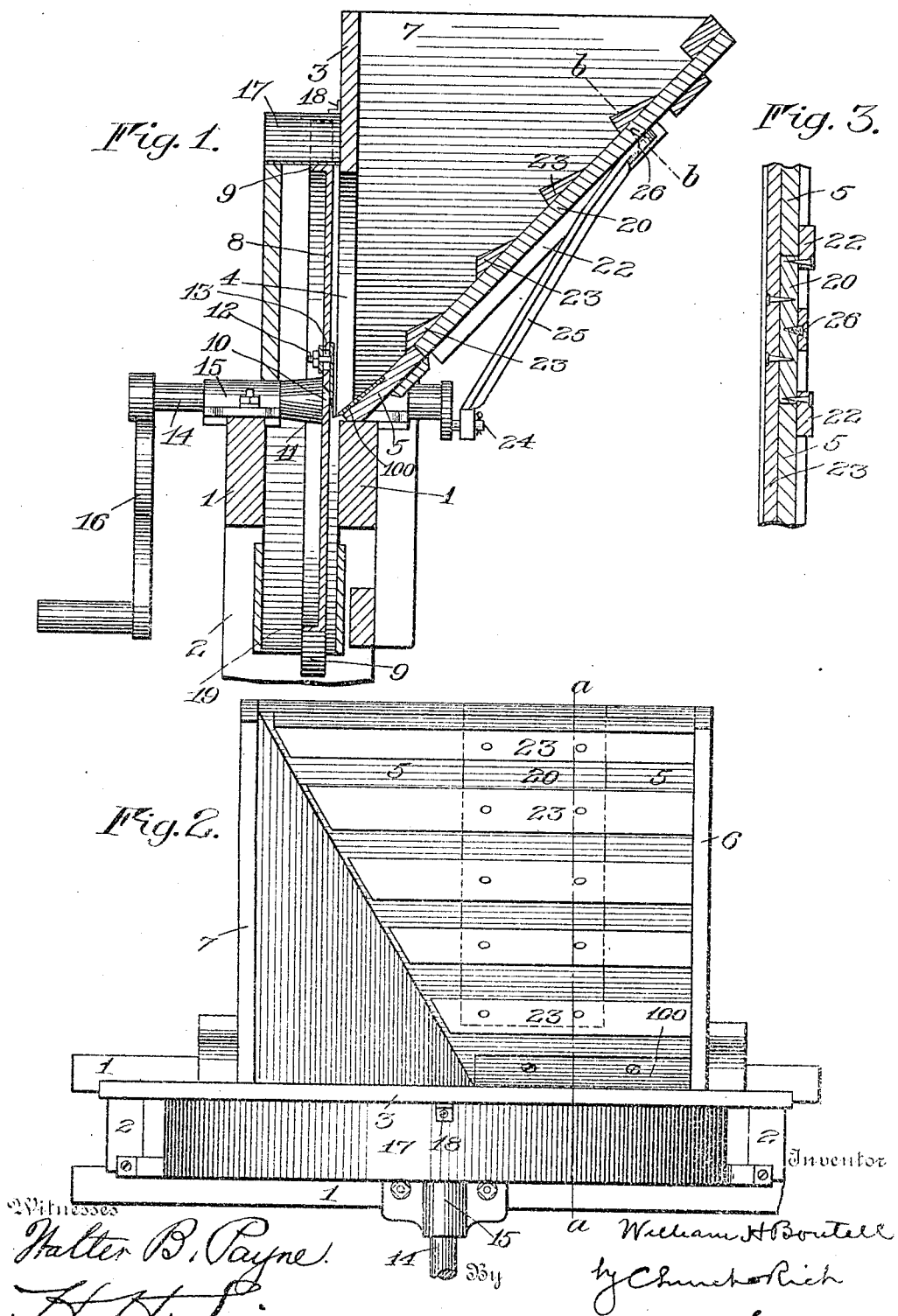

WILLIAM H. BOUTELL, OF ROCHESTER, NEW YORK, ASSIGNOR OF ONE-HALF TO BOUTELL MANUFACTURING COMPANY, OF ROCHESTER, NEW YORK, A CORPORATION OF NEW YORK.

FRUIT AND VEGETABLE SLICING OR CHOPPING MACHINE.

943,965.     Specification of Letters Patent.     Patented Dec. 21, 1909.

Application filed September 7, 1909. Serial No. 516,395.

*To all whom it may concern:*

Be it known that I, WILLIAM H. BOUTELL, of Rochester, in the county of Monroe and State of New York, have invented certain new and useful Improvements in Fruit and Vegetable Slicing or Chopping Machines; and I do hereby declare the following to be a full, clear, and exact description of the same, reference being had to the accompanying drawings, forming a part of this specification, and to the reference-numerals marked thereon.

The present invention relates to fruit and vegetable slicing or chopping machines of the type employing a hopper for conducting the material to be chopped to a cutter and it has for an object to effectively feed the material toward the cutter without interfering with the charging of the hopper.

To this and other ends the invention consists in certain improvements and combinations of parts all as will be hereinafter more fully described, the novel features being pointed out in the claims at the end of the specification.

In the drawings: Figure 1 is a sectional view of the slicer or chopper constructed in accordance with the present invention: Fig. 2 is a plan view of the same machine, parts being broken away, and *a—a* indicating the line on which the sectional view shown in Fig. 1 is taken; and Fig. 3 is a section on the line *b—b* of Fig. 1.

In the embodiment of the invention herein illustrated there is employed a frame comprising preferably a pair of spaced horizontal members 1 arranged parallel to each other and connected at their ends by uprights 2 serving as supports for the machine. Upon this frame is a hopper or container comprising in this instance an upright or perpendicular wall 3 provided with a discharge 4, an opposite inclined wall 5, a vertical wall 6 and an upright inclined wall 7, the material passing by gravity through the discharge to a suitable cutter.

The cutter, which may be of any construction, in this embodiment comprises a disk 8 reinforced at its periphery by an annular flange 9 and slotted radially at intervals, as at 10. In proximity to the opening or slots 10 are knives 11 which may be secured by bolts 12 passing through them and the slots 13 in the disk, this means permitting both the removal of the knives and also the adjustment of the latter at various angles to the fixed knife 100 at the discharge of the hopper. The disk 8 is preferably rigidly secured to a shaft 14 journaled on the horizontal pieces 1 at 15 and having a crank handle 16 or other suitable means by which it is rotated to carry the knives past the discharge opening 4. Preferably the disk operates between the horizontal members 1 and has its upper portion inclosed by a removable shield or casing 17 fastened at 18 to the frame and to the hopper wall 3. The lower portion of the disk may be surrounded by the chute 19 depending from the horizontal members 1 and acting to direct the chopped material into any suitable receptacle.

With the end in view of feeding the material toward the discharge 4 to prevent jamming or wedging of the material within the hopper and at the same time not to interfere with the charging of said hopper, there is employed a feeder which operates away from the center of the hopper and in proximity to one of the upright walls of the latter. In this instance the feeder moves in proximity to the inclined wall 5 opposite the wall 3 with the discharge opening. Preferably it is guided for reciprocation upon said wall and the latter is cut away to receive the slide 20 of the feeder, the side walls of the cutaway portion serving as guides and the slide being held in position by strips 22 arranged on the rear or outer face of the slide to coöperate with the outer face of the wall 5. On the inner face of the slide are arranged, one above the other, transverse strips 23, each having a length substantially co-extensive with the width of the proximate portion of the wall 5, the lower strip being projected below the lower end of the slide to close the opening between the lower end of the said slide and the proximate portion of the wall 5. As the ends of the strips extend beyond the sides of the slide they serve with the strips 22 to hold a slide within the cutaway portion of the wall 5. The upper faces of the strips 23 are arranged nearly parallel with the upper surface of the slide 20 so that the upward movement of the feeder will not materially agitate the contents of the hopper, while the faces disposed toward the discharge 3 are nearly perpendicular to the upper surface of the slide, except the lowermost two strips which have their equivalent faces more inclined in order that should the material become too compressed in the lowermost portion of the hopper these two strips move through the material and the operating mechanism of the feeder does not break.

Any suitable means may be employed for operating the feeder. In this instance the cutter shaft 14 is provided with a crank or wrist pin 24 connected to a pitman 25 which is pivotally connected at 26 to the outer face of the slide 20.

In operation, the material, such as apples, is placed within the hopper and the cutter is operated through the medium of the crank 16. This also effects the reciprocation of the feeder and causes the latter to push or draw the material in the hopper toward the discharge opening 4 where it is caught by the knives and discharged through opening 10 into the chute 19.

A slicer or chopper constructed in accordance with this invention is inexpensive to manufacture and simple to operate. It effectively forces the material toward the knife and prevents the clogging of the hopper. The feeder is so located that it does not interfere with the charging of the hopper, nor does it reduce the capacity of the latter.

I claim as my invention:

1. In a fruit and vegetable slicer or chopper, the combination with a hopper and a cutter adapted to operate on material discharged therefrom, of a feeder for moving the material toward the cutter, embodying a plurality of parallel strips movable in a plane parallel with and in proximity to one side wall of the hopper so that the charging of the latter is facilitated.

2. The combination with a hopper provided with a discharge and having an upright wall with a cut away portion, of a cutter adapted to operate on the material from the discharge, a slide mounted in the cutaway portion of the hopper and movable upwardly and downwardly in said cut-away portion and transversely extending strips carried by the slide.

3. In a fruit and vegetable slicer or chopper, the combination with a hopper and a cutter adapted to operate on material discharged from the hopper, of a reciprocatory feeder embodying a slide guided up and down on one of the upright walls of the hopper and operating away from the center of the latter to carry material downwardly therein toward the cutter.

4. In a fruit and vegetable slicer or chopper, the combination with a hopper having a discharge in one of the side walls thereof, and a cutter adapted to operate on material passing from the discharge, of a reciprocatory feeder embodying a slide and transversely extending strips, said feeder being guided upwardly and downwardly on the said wall of the hopper and in a plane parallel with said wall, and connections between the cutter and the feeder for causing their simultaneous operation.

5. In a fruit and vegetable slicer or chopper, the combination with a hopper having an upright wall provided with a discharge, and a rotary cutter adapted to operate on material from the discharge, of a reciprocatory feeder guided up and down an upright wall of the hopper, a crank connected to the rotary cutter, and a pitman connecting the crank with the feeder.

6. In a fruit and vegetable slicer or chopper, the combination with a hopper having a perpendicular wall provided with a discharge and an opposite inclined upright wall, of a cutter adapted to operate on material passing from the discharge, and a feeder guided on and in a plane parallel with the inclined wall to carry the material downwardly in the hopper.

7. In a fruit and vegetable slicer or chopper, the combination with a hopper having a perpendicular wall provided with a discharge and an opposite inclined upright wall, of a cutter adapted to operate on material passing from the discharge, and a reciprocatory feeder mounted to move on the inclined wall to carry material downwardly in the hopper.

8. In a fruit and vegetable slicer or chopper, the combination with a hopper having a perpendicular wall provided with a discharge and an opposite inclined upright wall, of a cutter adapted to operate on material passing from the discharge and a slide movable upwardly and downwardly on the inclined wall and carrying transverse ribs extending beyond the side of the slide.

9. In a fruit and vegetable slicer or chopper, the combination with a hopper having a perpendicular wall provided with a discharge and an opposite inclined and upright wall, of a rotary cutter mounted to operate on material from the discharge, a reciprocatory feeder guided for up and down movement on the inclined wall, a crank on the shaft of the rotary cutter, and a pitman connecting the crank with the reciprocatory feeder.

10. The combination with a frame embodying two horizontal and parallel members, of a hopper supported on said frame and having an upright wall provided with a discharge and an opposite inclined wall, a rotary cutter mounted between the parallel members and in proximity to the discharge of the hopper and having a shaft journaled on said parallel members, a reciprocatory feeder guided on an inclined wall of the hopper, a crank connected to the shaft of the cutter, and a pitman connecting the crank with the feeder.

11. The combination with a hopper embodying an upright wall provided with a discharge and an inclined wall having a cutaway portion, of a cutter adapted to operate on the material passing from the discharge, a slide mounted in the cutaway portion of the hopper, transverse strips carried by the slide, and extending beyond the sides thereof, and means for reciprocating the slide up and down.

WILLIAM H. BOUTELL.

Witnesses:
RUSSELL B. GRIFFITH,
G. WILLARD RICH.